Jan. 15, 1952   C. E. H. FRYKDAHL   2,582,862
REFRIGERATOR CABINET
Filed Sept. 28, 1946   3 Sheets-Sheet 3
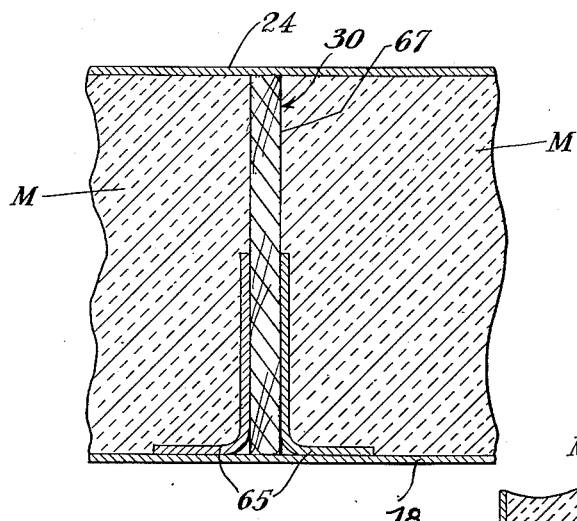
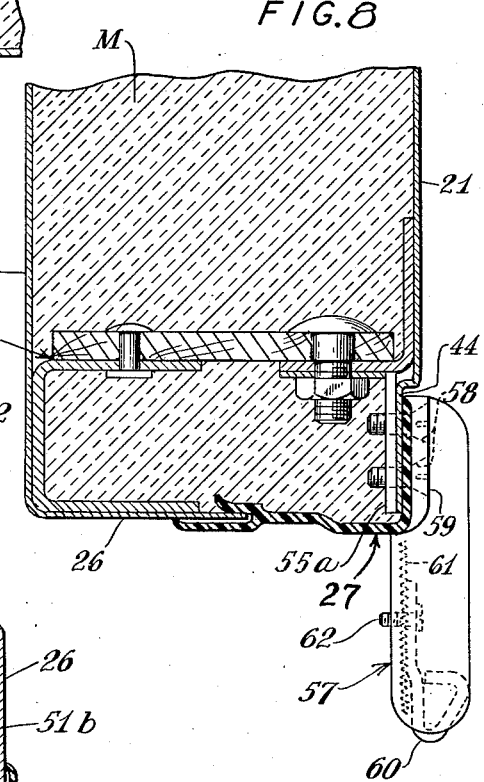
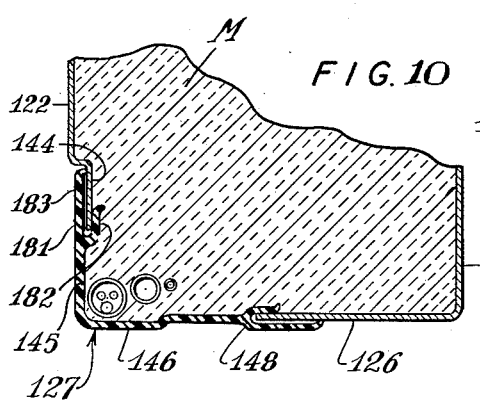
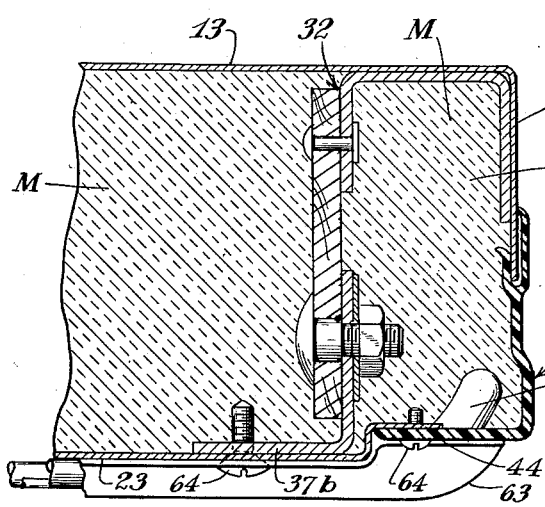
INVENTOR
CARL E. H. FRYKDAHL
BY Wallace and Cannon
ATTORNEYS:

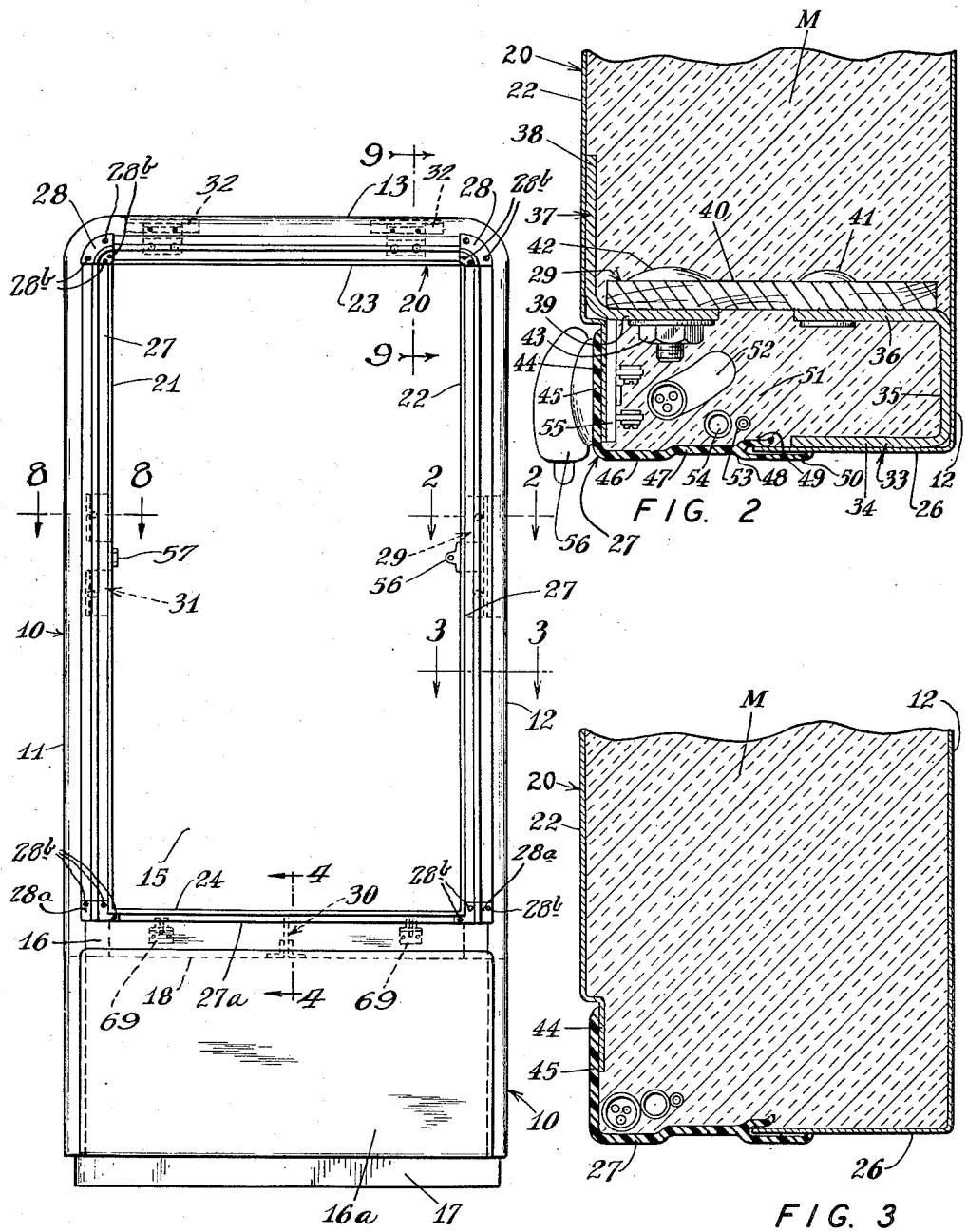

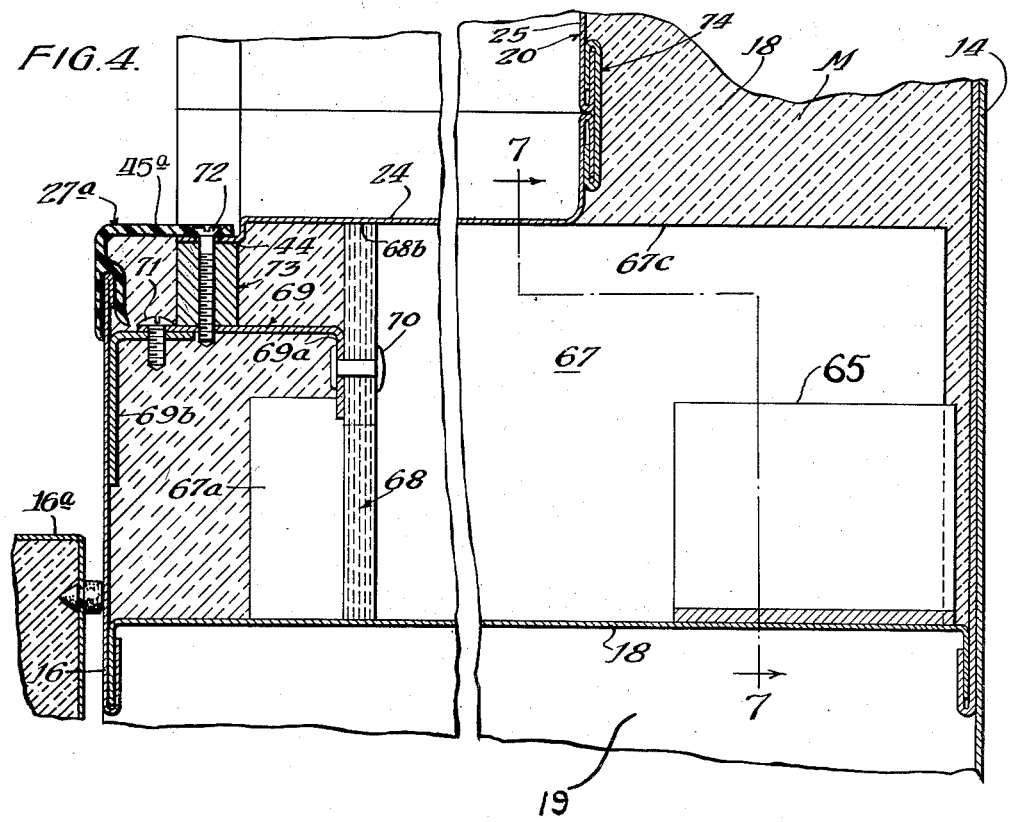
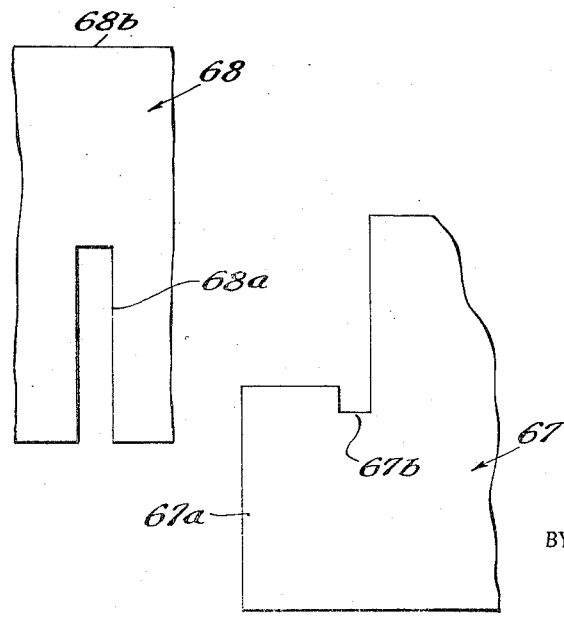

Patented Jan. 15, 1952

2,582,862

UNITED STATES PATENT OFFICE 2,582,862

REFRIGERATOR CABINET

Carl Edward Harry Frykdahl, Duluth, Minn., assignor to The Coolerator Company, Duluth, Minn., a corporation of Minnesota Application September 28, 1946, Serial No. 699,979

5 Claims. (Cl. 220—15)

This invention relates to refrigerator and like cabinets embodying inner and outer casings and primarily has to do with support of the inner casing within the outer casing in such a cabinet.

A refrigerator or like cabinet usually has insulating material interposed between the inner and outer casings thereof so as to enable a temperature to be maintained within the inner casing that is different from that surrounding the outer casing and in such instances it is desirable to keep the heat transfer between the two casings at a minimum and thereby maintain the efficiency of the unit at a high level. Furthermore, in the instance of a refrigerator cabinet, wherein the temperature within the inner casing is commonly maintained below the temperature surrounding the outer casing, heat transfer between the casings may give rise to sweating on the exposed surface of the outer casing under certain conditions. It is therefore important in refrigerator cabinets and the like that heat transfer between the inner and outer casings be kept at a minimum and to enable this to be realized in an efficient and novel manner is among the primary objects of this invention.

Heretofore in those instances where metallic or other casings having relatively high heat conductivity have been employed in cabinets of the aforesaid character it has been customary to employ a wooden supporting frame within the outer casing to support the inner casing in such a way as to interrupt heat transfer between the casings and thereby afford what is known as a heat break between the casings. However, the employment of such a wooden frame has not been entirely satisfactory due to deterioration of the wooden frame and the expense entailed in providing such a frame and manufacturing cabinets embodying them. It is therefore another important object of this invention to enable an inner casing to be supported within an outer casing in a cabinet of the aforesaid character without resorting to a wooden or other supporting frame.

The inner and outer casings or shells of a refrigerator or like cabinet are provided with aligned openings through which access is afforded to the area enclosed by the inner casing and such openings are closed by the door mounted on the outer casing to be movable to and from closed position with respect to the aligned openings in the casings. While it has been attempted heretofore to support the inner casing or shell within the outer casing by strips of material interposed between the two casings about the edges of the aligned openings afforded therein, it has been found difficult so to do in a practical manner for the reason that, for example, those materials which embodied sufficient structural strength to properly support the inner casing were usually of such nature that objectionable heat transfer could occur therethrough and those materials which had low heat conductivity usually did not possess the requisite strength to insure proper support of the inner casing from the outer casing. It is desirable, however, that the edges between the aligned openings afforded in casings of the aforesaid character be closed, for example, to retain the insulating material that is interposed between the two casings in position, and it is therefore yet another object of this invention to enable material of low heat conductivity to be interposed between the edges of aligned openings afforded in the inner and outer casings of a cabinet of the aforesaid character and yet at the same time enable the inner casing to be supported from the outer casing without there being objectionable heat transfer between the two casings.

It is often necessary in refrigerator cabinets and the like to establish electrical or other connections between apparatus disposed within the inner casing of such a cabinet and apparatus disposed exteriorly of such inner casing, and it is often desirable to afford access to such connections and, therefore, yet another object of this invention is to enable electrical, pipe or other connections, which serve to interconnect apparatus confined within the inner casing of a cabinet of the aforesaid character with devices disposed exteriorly of such a casing, to be disposed in such position that access may be readily had thereto and yet conceal and confine such connections within the area between the casings, and another object auxiliary to the foregoing is to enable connections of the aforesaid character to be disposed adjacent to a member extended between the edges of aligned openings in the inner and outer casings of the cabinet of the aforesaid character and to so arrange such member that removal thereof may be expeditiously effected so as to afford access to connections such as those referred to hereinbefore.

A further object of this invention is to so arrange a cabinet of the aforesaid character that connections of the character hereinabove referred to may be expeditiously installed and removed in the cabinet and thereby facilitate installation and removal of devices interconnected by such connections whether such devices are housed within or without the inner shell of a cabinet of the aforesaid character.

Other and further objects of the present invention are to provide attaching means on the inner and outer casings of a cabinet of the aforesaid character at spaced intervals and to interconnect such attaching means through the use of a relatively strong material possessing low heat conductive properties; to detachably interconnect the inner and outer casings of a cabinet of the aforesaid character and thereby facilitate installation, and removal where necessary, of the inner casing in a cabinet of the aforesaid character; and to so arrange the inner and outer casings of a cabinet of the aforesaid character and the arrangement for interconnecting such casings and supporting the inner casing from the outer casing that economy of construction and assembly may be realized as well as relatively high efficiency in the use of the cabinet.

Other and further objects of the present invention will be apparent from the following description and claims and are illustrated in the accompanying drawings which, by way of illustration show preferred embodiments and the principle thereof and what I now consider to be the best mode in which I have contemplated applying such principle. Other embodiments of the invention embodying the same or equivalent principles may be used and structural changes may be made as desired by those skilled in the art without departing from the present invention and the purview of the appended claims.

In the drawings:

Fig. 1 is a front elevational view of a cabinet embodying the present invention, and with the door removed;

Figs. 2, 3, and 4 are sectional views, drawn to an enlarged scale taken substantially and respectively on the lines 2—2, 3—3, and 4—4 on Fig. 1;

Fig. 5 is a detail front elevational view of the mid-portion of the longitudinal base-supporting member shown in Fig. 4;

Fig. 6 is a detail side elevational view of the front end portion of the transverse base-supporting member shown in Fig. 4;

Fig. 7 is a sectional view taken substantially on the line 7—7 in Fig. 4;

Figs. 8 and 9 are sectional views, drawn to the same scale as Figs. 2 to 4, taken substantially and respectively on the lines 8—8 and 9—9 on Fig. 1; and Fig. 10 is a sectional view similar to Fig. 3 and showing a modified form of construction.

The cabinet illustrated in the accompanying drawings comprises an outer casing or shell 10 having side walls 11 and 12, a top wall 13, and a rear wall 14. An opening 15 is provided in the upper portion of the front of the cabinet to permit access to the interior of the cabinet, and this opening may be normally closed by a door (not shown). The outer casing 10 also has a front wall 16 which extends downwardly from the lower edge portion of the opening 15, and a stand 17 supports the cabinet in such a manner that the side walls 11 and 12, rear wall 14 and the front wall 16, which are disposed vertically, terminate at their lower edges in spaced relation to the supporting surface or floor upon which the stand 17 rests. A door 16a is provided in the wall 16 and may be supported thereby in any suitable manner such as, for example, by hinges, not shown, and provides access to the lower portion of the cabinet. A horizontal partition or panel 18, positioned below the lower edge of the opening 15, extends between the side walls 11 and 12 and the rear and front walls 14 and 16, respectively, and together with the lower portion of these walls forms a compartment 19 which, in my refrigerator cabinet, serves to house the mechanism (not shown) by which heat is abstracted from the coolant used to refrigerate the area within the inner casing of the cabinet which is described hereinafter.

An inner casing or shell 20 having side walls 21 and 22, a top wall 23, a bottom wall 24, and a rear wall 25 is positioned within the outer casing 10 in such a manner that access to the inner casing 20 may be had through the opening 15. The inner casing 20 is smaller than the outer casing 10 so as to be spaced therefrom and is supported by the outer casing 10 in a manner to be described hereinafter.

The outer shell 10 has a flange 26 extending inwardly from the top wall 13 and the side walls 11 and 12 but not completely bridging the space between the inner and outer shells. The gap between the flange 26 and the inner shell 20 is bridged by plastic molding strips 27, the details of which will be described hereinafter. The corners are filled with preformed sections 28 and 28a which are connected to the strips by any suitable means such as screws 28b, and give the molding a pleasing appearance. The inner shell 20 is supported from the outer shell 10 by supporting members 29, 30, 31, 32 and 32 which will be presently described in detail in this specification.

Referring now to Fig. 2, the supporting member 29 is comprised of a channel bracket 33 having a side 34 spot-welded or otherwise secured to the flange 26, a web 35 abutting the side wall 12 of the outer shell 10, and a side 36 extending into the space between the inner and outer shells. An angle bracket 37 is also provided within the space between the shells, and has a side 38 spot-welded or otherwise secured to inner shell 19 and a side 39 extending toward side 36 of channel bracket 33. As shown in Fig. 2, sides 39 and 36 are in the same plane but it is understood that they may be in different planes if desired. Connecting the sides 39 and 36 is a rigid strip of low heat conductant material 40 such as, for example, material which has been commercially produced from different raw materials such as bagasse or wood, the latter raw material being processed as taught in the Mason Patent No. 1,663,505, patented March 20, 1928, to afford a coherent grainless, hard, dense, stiff and strong product having practically all of the characteristics of natural wood, but of greater density and without grain. Said connecting strip 40 is secured by one or more rivets 41 to the side 36 and by one or more bolts 42 and nuts 43 to the side 39.

The front edge portion of the side walls 21 and 22, and the top wall 23, and bottom wall 24 of the inner casing 20 have an offset portion 44, and this offset portion 44 is connected to the flange 26 of the outer casing 10 by the plastic molding strips 27. The molding strips 27 may be made of extruded plastic and have a flat side 45 overlying offset region 44 of the inner casing 20 and a side 46 which is substantially perpendicular to the side 45. The side 46 has an offset portion 47 having a bifurcated end 48. One bifurcation 49 is shorter than the other 50 and each bifurcation is curved inwardly at the end, and the space between the bifurcations is such that in placing bifurcated end 48 of the plastic strip 27 in position to engage the flange 26, it is necessary for the flange 26 to wedge the bifurcations 49 and 50 apart which causes the bifurcations 49 and 50 to bear tightly against the flange 26 after the flange 26 has been positioned therebetween and thereby effect a seal. After the plastic strip 27 is in place, the side 45 thereof is secured to the offset region by suitable means such as screws (not shown) or the like.

It will be observed that the positioning and construction of the support 29 leaves a clear space 51 through the space between the inner wall 22 and the outer wall 12, defined by the connecting strip 40, the offset portion 44 of the wall 22, the plastic strip 27, the flange 26 and channel bracket 33, through which space may be positioned electrical lines, and gas and liquid conduits of my refrigerator such as, for example, the three wire cable 52, and the cold liquid conduit 53 and a return gas conduit 54. By locating the cable and conduits in the corner of the space 51 adjacent to the molding strip 27, they are readily accessible by merely removing the molding strip 27.

The angle bracket 37 is also provided with a tongue 55 formed by bending over a section of the side 38. The tongue 55 forms a support upon which may be mounted a switch 56 for controlling a light or other accessories of the cabinet, the switch 56 being attached to the tongue 55 in any suitable manner such as by screws, not shown, or the like. The proximity of the cable 52 to the tongue 55 facilitates the connection of the switch 56 to the cable.

It will be observed from Fig. 8 that the support 31 is constructed similarly to the support 29. The tongue 55a, however, is used to support a door strike 57, of any suitable construction, by means of machine screws 58 passing through a lug 59 of the door strike 57, the molding strip 27, and the offset portion 44 of the inner wall 21. The strike illustrated is adjustable by moving a catch 60 along serrations 61 to the desired position and then tightening a screw 62.

Two identical supports 32 are used as upper supports in my cabinet and each is positioned in a corner thereof. The supports 32 (Figs. 1 and 9) are also similar in construction to the support 29 except that no tongue is formed on the angle bracket 37b. A space 51b is defined between the upper walls 13 and 23 in a manner similar to that by which the space 51 is defined between the side walls 12 and 22, and, adjacent to the support 32 positioned toward the right corner of the refrigerator 10 (Fig. 1), an opening is provided in the molding strip 27 between the space 51b and the interior of the inner casing 19. A housing 63 is fastener to the inner surface of the top wall 23, in communication with the opening formed in the molding strip 27, by means of screws 64, and the cable 52 and the conduits 53 and 54 may be extended from the space 51, through the space 51b, the opening in the plastic strip 27 and the housing 63 into the interior of the inner casing 20. The housing 63 may be of any desired length necessary to support the cable 52 and the conduits 53 and 54 to the desired position within the inner casing 20, and is packed with a suitable material surrounding the cable and conduits to effect a seal between the interior of the inner casing 20 and the space 51b.

The bottom wall 24 of inner shell 20 may be supported from the partition or panel 18 by the construction shown in Figs. 1, 4, and 7. In this construction a pair of angle brackets 65 are secured to the rear portion of partition 18 by spotwelding, or other suitable means, the pair of brackets being positioned to receive a strip 67 of rigid low heat conductant material such as the aforementioned commercial product processed in accordance with the Mason Patent No. 1,663,505. The spacing apart of the angle brackets 65 is such that they are slightly sprung when the strip 67 is in place, so that the strip is tightly gripped therebetween and securely held in place. The front end portion 67a has a notch 67b formed therein, the purpose of which will presently be explained.

A second strip 68 of rigid low heat conductant material, having a slot 68a formed in the midportion thereof is positioned transversely to the strip 67 and has its slot 68a interlocked with the notch 67b. Two identical channel brackets 69 are attached to the strip 68, near opposite ends thereof, by rivets 70. The rivets 70 are fastened to one side 69a of the bracket and the other side 69b thereof is fastened to the inner surface of the front wall by any suitable means such as spot welding. The channel brackets 69 may be made in one piece or, as I prefer and as is shown in Fig. 4, may be made in two pieces which are connected together by screws 71, so that the brackets may be easily disassembled, if desired, and the strip 68 removed.

The bottom wall 24 of the inner shell 20 rests directly upon the top edge 67c of the strip 67 and the top edge 68b of the strip 68, and is thus supported over the greater portion of its depth and length.

The joint between the lower wall 24 of the inner casing 20 and the front wall 16 of the outer casing 10 differs from the construction used with relation to the supports 29, 31 and 32 in that the flat side 45a of the molding strip 27a is fastened to the channel brackets 69 by means of screws 72 rather than directly to the offset portion 44 of the lower wall 24. The heads of the screws 72 are counter-sunk into the molding strip 27a, and the screws 72 extend through the molding strip 27a and the offset portion 44 of the bottom wall 24 and are screwed into the channel brackets 69, the opening through which each screw 72 passes in the offset portion 44 being of sufficient size that direct contact between the screw 72 and the offset portion 44 is avoided. Blocks 73 of the aforementioned rigid low heat conductant material, are positioned between each of the brackets 69 and the flange 44 to support the latter, and act as heat breaks therebetween. The molding strip 27a, used between the lower wall 24 and the front wall 16, is formed in a manner similar to the molding 27 except that it does not have the offset portion 47.

The bottom wall 24 of the inner casing 20 is attached to the side and rear walls thereof by a joint 74, as is best seen in Fig. 4, and the top wall 23 is likewise attached to the side and rear walls by a similar joint (not shown).

An opening (not shown) is provided in the horizontal partition 18 through which the cable 52, and gas and liquid conduits 54 and 53 are passed from the compartment 19 to the space 51 between the inner wall 11 and the outer wall 12. The opening is formed in the partition 18 substantially in alignment with the front inner corner of the space 51 and is preferably sealed around the cable 52 and the conduits 53 and 54 to effect a seal between the lower housing 19 and the space between the inner and outer shells.

It is understood that the space between the walls of the inner and outer shells is filled with a heat insulating material M such as rock-wool or the like.

The modified form of construction illustrated in Fig. 10 is similar to that illustrated in Figs.

1 to 9 inclusive, and like elements are indicated by the same reference number with the prefix "1" added thereto.

The difference between the construction shown in Fig. 10 and the other figures is the difference between the plastic molding strips 127 and strips 27 and 27a. The molding strip 127 has, in addition to the bifurcated end 148, another bifurcated end 181, having bifurcations 182 and 183, for engagement with the offset portion 144 of the inner wall 122, the construction and operation of which it is submitted will be obvious from consideration of Fig. 10 taken with the description heretofore set forth with respect to the construction and operation of the bifurcated end 48.

In placing the plastic molding strip 127 in position between the flange 126 of the outer wall 112 and the reduced portion 144 of the inner wall 122 it is necessary to start one bifurcated end onto the flange it is to engage, as for example, the bifurcated end 148 onto the flange 126, and then spring the other arm (in this case arm 145) inwardly until the inner bifurcation slips past the edge of the other flange (in this case offset portion 144). The molding can then be moved into final position by pressing inwardly on the corner formed by the junction of the arm 145 and the arm 146 and thereby sliding the bifurcated ends 148 and 181 into final position on the flanges 126 and offset portion 144, respectively.

It will be apparent from the foregoing description that the cabinet construction herein described requires no frame and that the support of the inner container from the outer container is effected by short strips of low heat-conductant material, and the heat losses through the support are thus minimized. Since the low heat-conductant support is substantially impervious to moisture there is no danger of the support warping or rotting. The spacing of the support from the side walls leaves a clear space through which electric and fluid lines may be passed from the refrigerant producing apparatus in the base to the heat abstracting apparatus within the cabinet. The plastic corner molding or facing seals the insulation in the space between the inner and outer shells and is readily removable to provide access to the electric and fluid lines.

Also, it will be noted that the present invention accomplishes its intended objects, some of which have been specifically referred to hereinbefore and others of which will be apparent from the foregoing description taken in conjunction with the accompanying drawings.

While I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. A cabinet comprising an outer shell, an inner shell positioned within and supported by said outer shell in spaced relation thereto, said inner shell having a bottom wall, a substantially horizontal partition positioned within said outer shell and supported thereby below said inner shell, a pair of brackets attached to the upper surface of said partition, and means for supporting said inner shell from said outer shell and including a strip of low heat-conductant material extending between and slidably engaged by said pair of brackets and having an edge portion in engagement with said bottom of said inner shell and another edge portion resting on said horizontal partition to be supported thereby, and said means also including a second strip of low heat conductant material extending at an angle to said first mentioned strip and having an edge portion in engagement with said bottom of said inner shell and another edge portion resting on said horizontal portion to be supported thereby, at least one of said strips having a slot formed therein and the other of said strips being engaged in said slot.

2. A cabinet comprising an outer shell, an inner shell disposed within and spaced from said outer shell, said inner and outer shells having corresponding top, bottom and side walls and openings at the front, a substantially horizontal partition disposed within and supported by said outer shell, brackets attached to the top and side walls of the inner casing in spaced relation to the edge portion of said opening, brackets attached to the top and side walls of the outer casing in spaced relation to the edge portion of said opening, strips of low heat-conductant material disposed in spaced relation to said openings and interconnecting said brackets attached to the corresponding top and side walls of said inner and outer shells, supporting means attached to said partition, a strip of low heat-conductant material removably engaged with said supporting means and said partition and engaging said bottom wall of said inner shell, and a removable strip of low heat-conductant material connecting an edge portion of said outer shell to an edge portion of said inner shell, said last named strip having a bifurcated end portion adapted to receive said edge portion of said outer shell, and another bifurcated edge portion adapted to receive said edge portion of said inner shell.

3. A double-walled cabinet comprising spaced inner and outer shells having openings on corresponding sides thereof, a flange on the outer shell extending into the opening therein and substantially perpendicular to the terminal portion of said inner shell and spaced therefrom, said terminal portion having its free edge terminating inwardly from the plane of said flange, the free edge of said flange being spaced outwardly from the plane of said terminal portion, and a plurality of means for supporting the inner shell from the outer shell, each of said means comprising a bracket having a free side parallel to said flange, a side secured to the flange in spaced relation to the free edge of said flange, and a side abutting the shell adjacent the flange; another bracket having a free side extending toward the free side of said first mentioned bracket; and a side secured to the inner shell in inwardly spaced relation to the free edge of said terminal portion; a low-heat conductant member having portions engaging the free sides of the brackets; and means securing the said engaging portions to the said free sides; and a strip of substantially rightangular cross section mounted on said flange and said terminal portion and having two bifurcated edges, said flange being disposed in one of said bifurcated edges, and said terminal portion being disposed in the other of said bifurcated edges.

4. A double walled cabinet as defined in claim 3 in which the inner legs of the two bifurcated edges have their longitudinal edge portions directed away from the outer legs.

5. A strip of low heat conductive material for sealing the opening between the inner and outer shells of a refrigerator cabinet, said strip being substantially right-angular in cross section and each web thereof having bifurcated edges extending throughout the length of each web, the inner leg of each bifurcated edge being shorter than the outer leg and having its free edge directed away from the outer leg.

CARL EDWARD HARRY FRYKDAHL.

REFERENCES CITED

The following references are of record in the file of this patent:

UNITED STATES PATENTS

| Number | Name | Date |
|---|---|---|
| 1,504,353 | Kilius et al. | Aug. 12, 1924 |
| 2,166,629 | White | July 18, 1939 |
| 2,176,717 | King | Oct. 17, 1939 |
| 2,215,889 | Swedman | Sept. 24, 1940 |
| 2,254,780 | Quimper | Sept. 2, 1941 |
| 2,256,013 | Brouse | Sept. 16, 1941 |
| 2,261,882 | Howard | Oct. 4, 1941 |
| 2,279,050 | Lenning | Apr. 7, 1942 |
| 2,295,103 | Friedly | Sept. 8, 1942 |
| 2,385,908 | Armstrong | Oct. 2, 1945 |

FOREIGN PATENTS

| Number | Country | Date |
|---|---|---|
| 372,453 | Great Britain | May 12, 1932 |
| 648,896 | Germany | Aug. 10, 1937 |